United States Patent [19]

Jackson

[11] 4,061,534

[45] Dec. 6, 1977

[54] NUCLEAR REACTORS

[75] Inventor: George Oliver Jackson, Timperley, England

[73] Assignee: United Kingdom Atomic Energy Authority, London, England

[21] Appl. No.: 187,183

[22] Filed: Oct. 6, 1971

Related U.S. Application Data

[63] Continuation of Ser. No. 799,834, Feb. 17, 1969, abandoned.

[51] Int. Cl.² .................. G21C 13/00; G21C 15/00
[52] U.S. Cl. .......................... 176/37; 176/38; 176/40; 176/65; 176/87
[58] Field of Search ................ 176/50, 51, 49, 65, 176/87, 40, 17, 18, 37, 38

[56] References Cited

U.S. PATENT DOCUMENTS

| | | | |
|---|---|---|---|
| 3,175,958 | 3/1965 | Bourgade | 176/51 |
| 3,372,092 | 3/1968 | Margen | 176/87 |
| 3,398,050 | 8/1968 | Yevick et al. | 176/17 |
| 3,421,977 | 1/1969 | Hutchinson et al. | 176/40 |
| 3,446,703 | 5/1969 | Lyons et al. | 176/49 |
| 3,454,080 | 7/1969 | Kunzli | 176/87 |
| 3,494,829 | 2/1970 | Mialki et al. | 176/49 |
| 3,497,421 | 2/1970 | Thome | 176/87 |

FOREIGN PATENT DOCUMENTS

| | | | |
|---|---|---|---|
| 1,224,251 | 2/1960 | France | 176/65 |
| 946,114 | 1/1964 | United Kingdom | 176/50 |

OTHER PUBLICATIONS

Directory of Nuclear Reactors, vol. V, 1964, pp. 53–57.
ANL-6377, 8161, pp. 4–7, 9, 10, 13–18.

*Primary Examiner*—Harvey E. Behrend
*Attorney, Agent, or Firm*—Larson, Taylor and Hinds

[57] ABSTRACT

A nuclear reactor cooled by a freezable liquid has a vessel for containing said liquid and comprising a structure shaped as a container, and cooling means in the region of the surface of said structure for effecting freezing of said liquid coolant at and for a finite distance from said surface for providing a layer of frozen coolant on and supported by said surface for containing said liquid coolant. In a specific example, where the reactor is sodium-cooled, the said structure is a metal-lined concrete vault, cooling is effected by closed cooling loops containing NaK, the loops extending over the lined surface of the concrete vault with outward and reverse pipe runs of each loop separated by thermal insulation, and air is flowed through cooling pipes embedded in the concrete behind the metal lining.

7 Claims, 3 Drawing Figures

NUCLEAR REACTORS

This is a continuation, of application Ser. No. 799,834 filed Feb. 17, 1969, now abandoned.

BACKGROUND OF THE INVENTION

This invention relates to nuclear reactors, and in particular to that kind of nuclear reactor which is cooled by, and whose core is submerged in a pool of, a freezable liquid.

The invention has arisen in the context of reducing the capital cost of large power-producing liquid metal cooled fast breeder reactors, and of increasing the safety thereof.

SUMMARY OF THE INVENTION

According to the invention, a nuclear reactor which is cooled by, and whose core is submerged in, a freezable liquid, has the liquid contained by a continuous layer of the liquid frozen into the solid state and supported by a support structure.

According to another aspect of the invention, a vessel for containing a freezable liquid coolant in or for a nuclear reactor, comprises a structure shaped as a container, and cooling means in the region of the surface of said structure for effecting freezing of said liquid coolant at and for a finite distance from said surface, whereby there is provided a layer of frozen coolant on and supported by said surface for containing said liquid coolant.

DESCRIPTION OF THE DRAWINGS

Constructional examples embodying the invention will now be described with reference to the accompanying drawings, wherein.

DESCRIPTION OF PREFERRED EMBODIMENTS

Figure 1:
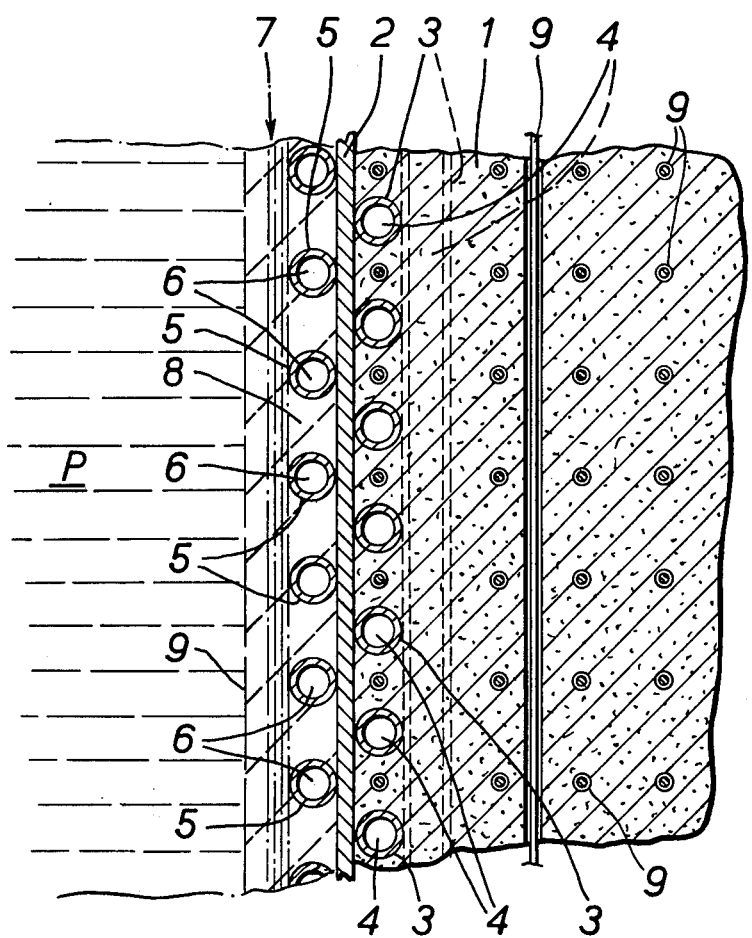
FIG. 1 is a diagrammatic, detached side view in section of part of a coolant-containing vessel for a liquid metal cooled nuclear reactor and illustrates the principle of the invention.

Referring firstly to FIG. 1, this drawing seeks to illustrate the invention as it may be applied by way of example to a sodium-cooled nuclear reactor of the kind described and illustrated in the Paper by A. G. Frame et al read before the London Conference on Fast Breeder Reactors, May, 1966 and reported at pages 291 - 315 of the Proceedings of that Conference published in 1967 by Pergammon Press.

This reactor is provided with a double-walled vessel for containing the bulk sodium in which the reactor core, primary heat exchangers and a pump are submerged, the interspace being employed as a leak jacket for collecting and detecting any leaks from the inner vessel. The vessel is disposed in a concrete vault. Thus there are separate walls to ensure that no catastrophic draining away of the sodium shall occur. The present invention provides the moans to simplify and make more economic the containing of the sodium without relaxing the high degree of integrity of the existing design as typified in the said Paper.

Instead of employing a double-walled vessel, the concrete vault is formed to the desired shape of the sodium-containing vessel given the necessary amount of pre-stressing (ducted cables 9 in FIG. 1) to enable it to serve as a task. Its wall, a portion of which is illustrated in the drawing and designated 1, is provided with a membrane lining 2 which can be of an inexpensive material such as mild steel. Pipes 3 for a cooling or refrigerating fluid 4 are embedded in the wall 1 so as to be in contact with the lining 2 over as much of the inner surface thereof as is necessary. Further pipes 5 are provided on the outer side of the lining 2 and contact as much of its outer surface as is necessary, the contact positions being chosen to be in staggered relationship to those of the inner pipes 3, whereby as little as possible of the lining 2 is left uncontacted by either pipes 3 or 5. Cooling or refrigerating fluid 6 flows through the pipes 5, and may be the same fluid as 4, where this is compatible with sodium, or is a fluid which is compatible with sodium where the fluid 4 is not. Thus the fluid 4 may be water, a freon or an areton, whereas the fluid 6 must not be any of these substances, which are strongly reactive with sodium. The fluid 6 (and additionally the fluid 4 if desired) may be the sodium/potassium eutectic (which is fluid at room temperatures), or may be a pressurized gas e.g. helium, argon, carbon dioxide, or may be a proprietory coolant known as DOWTHERM (Registered Trade Mark) Grade E, which is understood to be a treated orthodichlorobenzene with a freezing point of $-7°$ F, a boiling point of 352° F, and a thermal conductivity at 500° F of 0.120 B.T.U. $hr^{-1} sq.ft.^{-1} °F^{-1}$. All of these coolants are compatible with sodium over the operating temperature range applicable to the type of reactor envisaged.

The effect of cooling employing the fluids 4 and 6 in the pipes 3 and 5 respectively, is twofold. Firstly, with a mean temperature of about 400° C of a sodium pool P contained in the lined vault, the cooling is designed to keep the temperature of the lined surface of the concrete wall 1 well within the limit prescribed for concrete, and furthermore keeps the temperature gradient across the concrete wall from lined surface to outer surface (not shown) to about 50° C, which is a figure chosen as an optimum against the necessity of providing extra prestressing to guard against the effects of differential expansion. It may be necessary to augment the cooling effect produced by the pipes 5 and fluid 6 by the provision of thermal insulation over the pipes 5 (as shown in the drawing in dot-and-dash lines and designated 7) in order to bring about a reduction of temperature from the mean of about 400° C of the bulk sodium P down to about 50° C at the lined surface of the concrete.

The second effect of the cooling is that it brings about freezing of the molten sodium pool P at the volume thereof which is adjacent, in contact with and supported by the lining 2 of the wall 1 (pure sodium freezes at 98° C). In the drawing, the frozen volume is indicated diagrammatically by the shaded area 8, and the boundary of the volume is indicated by the broken line 9'. It is accomplished, by control of the cooling, that the boundary 9' is clear of the pipe 5 and, where provided, the thermal insulation 7, so as to produce an unbroken surface of the frozen sodium volume 8. It is this surface which in effect now forms the wall of the sodium-containing vessel, with all th advantages which accrue, including compatibility (identical material), self-sealing property, and ability to act as cold trap for impurities (either reinforcing or replacing existing cold trapping facilities).

It is desirable to provide instrumentation to indicate any variation of parameters adjacent the concrete wall 1. Such instrumentation may include thermocouples, and thickness gauges to monitor the thickness of the frozen sodium layer. There may be feed-back from such instrumentation to control the amount of cooling produced by one or both fluids.

Further advantages accrue from the ability more readily to shape a coolant-containing vessel to as complicated a shape as desired, since it is easier and less expensive to shape a concrete structure and relatively thin mild steel lining than it is to shape a metal vessel constructed to exacting pressure vessel standards, and from the general principle of its being more economic to employ existing containment structure with the addition of a lining and cooling means instead of having to provide a separate vessel built to exacting pressure vessel standards.

Figure 2:
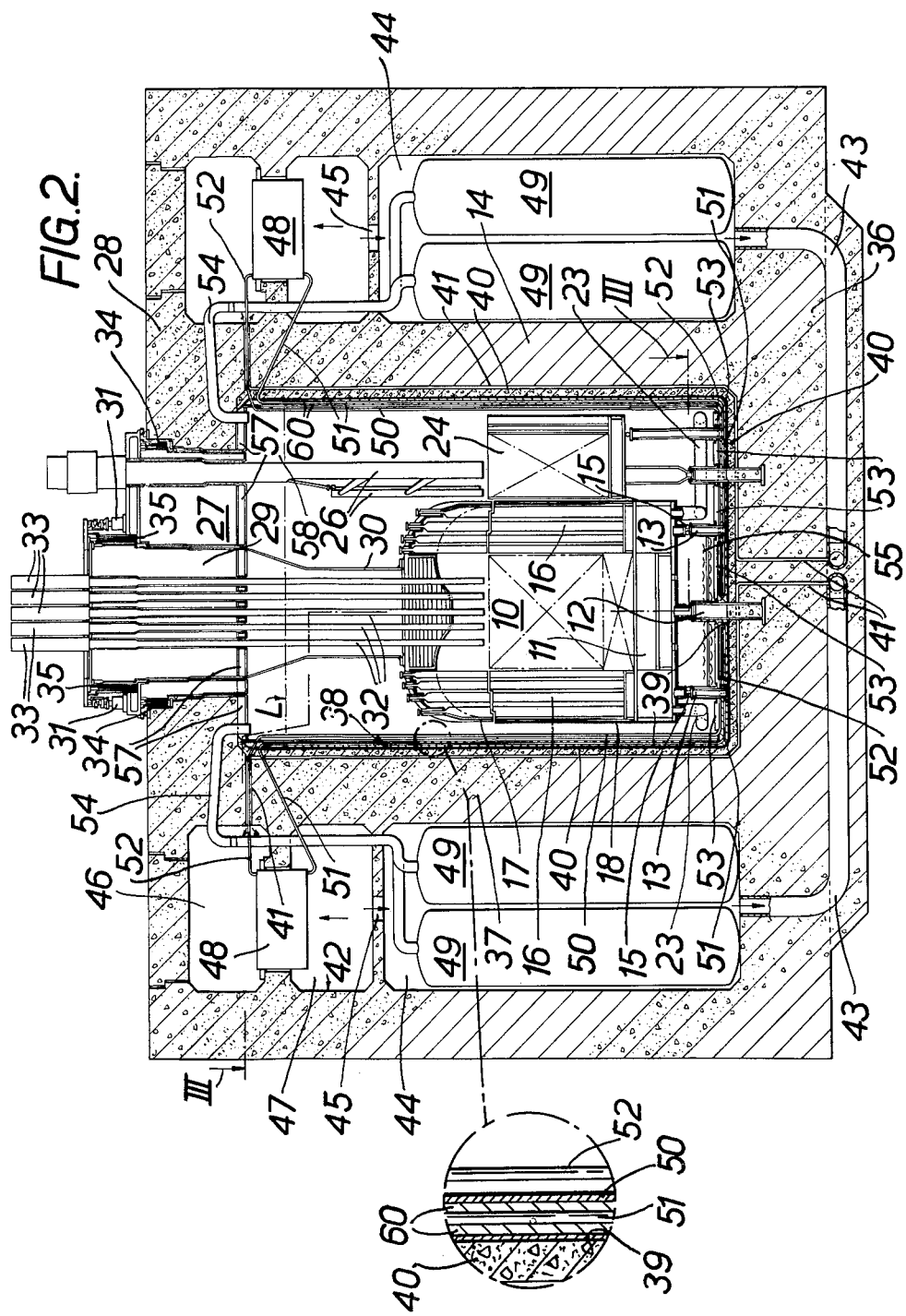
FIG. 2 is a side view, mainly in section on line II — II of FIG. 3, of a liquid metal cooled fast breeder nuclear reactor.
Figure 3:
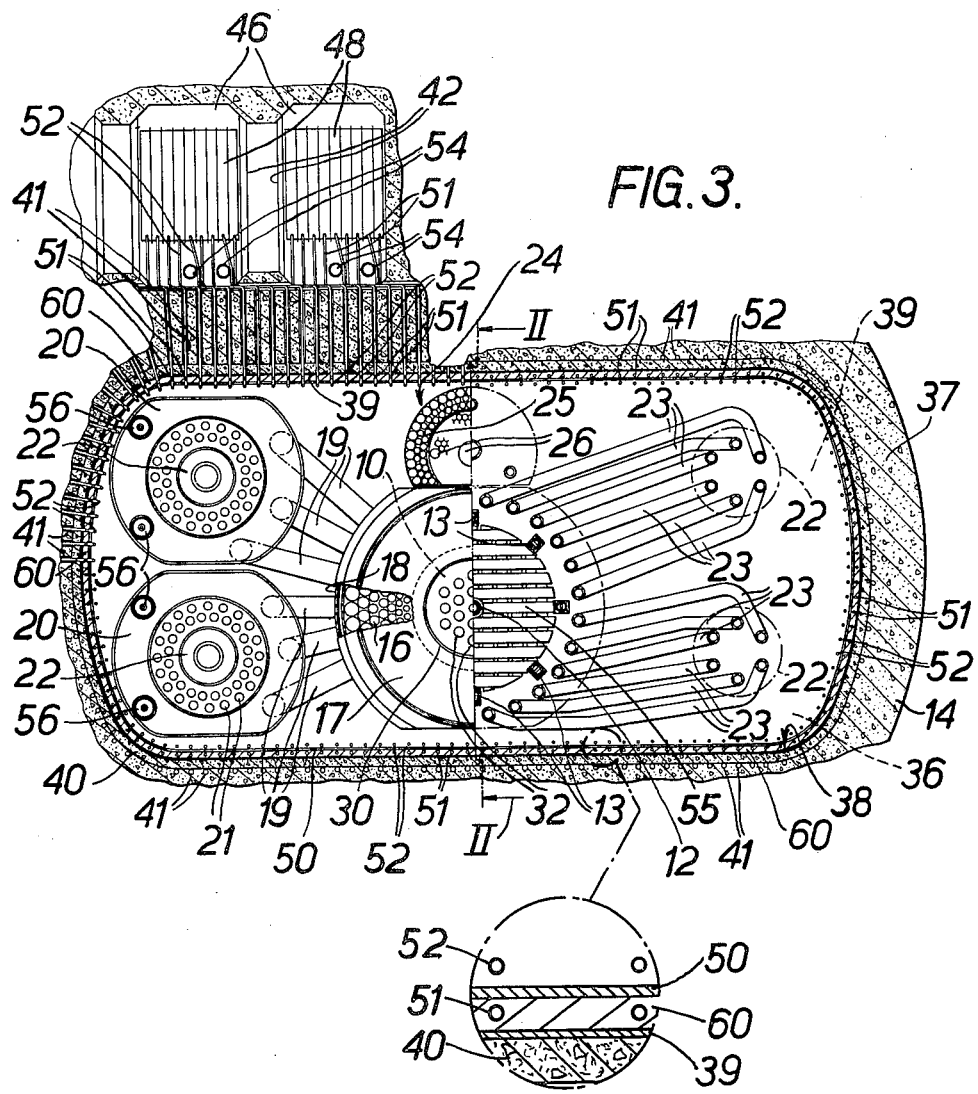
FIG. 3 is a plan view in section on line III — III of FIG. 2.

Referring now to FIGS. 2 and 3, those drawings illustrate a large (600 MW(E)) power generating fast breeder nuclear reactor cooled by liquid sodium, and having the present invention incorporated in the design thereof. As the invention resides in the sodium-containing part of the reactor, features unconnected therewith will only be briefly mentioned. The core 10 (including radial and axial breeder regions) of the reactor is generally cylindrical and is supported on a diagrid 11 carried by a massive centre pillar 12 and a concentric ring of secondary pillars 13 mounted on the floor of a concrete vault 14, there being roller bearings 15 on the pillars 13 but not the massive centre pillar 12 to allow the diagrid 11 to adapt position transversely as a result of thermal expansion and contraction of itself and of connected equipment. A core catcher 55 is provided below the diagrid 11 in case of melt-down. The core 10 is surrounded peripherally by a radial neutron shield 16, and above by an upper neutron shield which is included in a lid 17 which completes an enclosure 18 for the core and radial shield 16. Primary sodium which has passed over fuel rods in fuel sub-assemblies constituting the core and breeder regions leaves the enclosure 18 via ducts 19 and is taken to intermediate heat exchangers (of which there are four) designated generally 20, where it flows over tubes 21 and transfers heat to secondary coolant (also sodium) flowing in the tubes 21, the secondary sodium being employed externally of the reactor to raise steam to drive a turboalternator (not shown) to generate power. Each heat exchanger 20 has a circulating pump 22 for the primary sodium associated with it. Return ducts 23 take the feed of primary sodium from pumps 22 back to the lower end of core enclosure 18 for flow upwardly through the core and breeder regions.

A fuel store 24 situated at one side of the core 10 has its own shielding 25 and provides accommodation for both new and irradiated fuel and radial breeder sub-assemblies prior to charging the new sub-assemblies into or after withdrawing the irradiated sub-assemblies from, the core or breeder regions. A refuelling machine 26 serves for supplying new fuel to and withdrawing irradiated fuel from, the fuel store 24 by lowering or lifting, respectively. The machine 26 also serves, in conjunction with rotation of an outer rotatable shield 27 in a roof 28 integral with the vault 14, to transfer fuel sub-assemblies from fuel store 24 to core 10 and vice-versa.

The outer rotatable shield 27 has its axis eccentric to the axis of the core 10, but coincident with the joining line of the major and minor axes of the container (described in more detail hereafter) for the sodium pool in which the enclosed core 10 is submerged. The outer shield 27 has within its boundary an inner shield 29 rotatable therein, the axis of the inner shield being coaxial with the core 10 axis. The inner shield 29 is joined by a pillar 30 to the core enclosure lid 17 and in addition to being rotatable is also raisable relative to outer shield 27 by jacks 31 (of which there are conveniently 15 spaced around the periphery), such raising also serving to raise the core lid 17 and thus withdraw from penetration into the core various monitoring devices (not shown) such as outlet channel thermocouples and sampling pipes for failed fuel element detection. This raising permits the outer shield 27 to be itself rotated for refuelling purposes. The inner shield 29 carries control and shut-down rod tubes 32 and control rod operating mechanisms 33, the latter being mounted on the external surface of the shield 29 for access purposes. Control and shut-down rods (not shown) are detached from their operating mechanisms and left in the core during refuelling operations involving rotation of outer shield 27. Dip seals 34, 35 employing mercury are provided for the shields 27, 29 respectively.

The sodium-containing features of the reactor, the subject of the present invention, will now be described in detail. The concrete vault 14, consisting of a base 36, wall 37 and the roof 28, has a generally rectangular-with-rounded-ends section (FIG. 3), and forms a support means 38 with substantially vertical sides and a flat bottom. The wall 37 and base 36 have a metal lining 39 on a layer 40 of a known concrete which is specially adapted to withstand a higher temperature than ordinary concrete. Along the joining plane bottom the layer 40 and the ordinary concrete, a multiplicity of pipes 41 which generally follow the contours of the sides and base, are laid. At the upper end of the support means 38, the pipes 41 extend outwardly and into the nearest of a number of series-connected chambers (two only of which are shown in FIGS. 2 and 3, designated 42) which extend all around the structure, within the wall 37. At the lower end of the support means 38, the pipes 41 extend in the base 36 to nearly the core axis, then bend and extend downwardly to join a header 43 which header connects to the lower end of a series of surge tank chambers 44 diposed beneath the chambers 42 (FIG. 3). A duct 45 connects the lower end of the chambers 42 to the upper end of the chambers 44.

Each of the chambers 42 is divided into upper and lower regions 46, 47 respectively, by a heat exchanger 48 extending across the chamber. Forced draught air, employing a conventional air circulator, is supplied to the regions 47 of all the chambers 42 and flows downwardly into the surge tank chambers 44, over the surge tanks 49 therein, along the header 43, and along the pipes 41, cooling the concrete of the base 36 and wall 37 in its passage, before returning to the upper regions 46 of chambers 42 for discharge.

On the inside of the metal lining 39 of the wall 37 and spaced therefrom there is disposed a continuous thermal insulation structure 50. Between the structure 50 and the lining 39 and at spaced intervals around the wall 37 (FIG. 3) are a multiplicity of pipe runs 51 spaced from the lining 39, each of which extends downwardly to the base 36, bens to follow the base 36 still spaced from the lining 39, extends radially nearly to the core axis (shown in FIG. 2 but not in FIG. 3 for clarity), then reverse to form a return run 52 generally parallel to run 51 but, along the wall 37, lying on the inside of structure 50. Along the base 36, the pipe run 52 is associated with built-up thermal insulation generally indicated by the reference numeral 53. The pipe runs 51, 52 at the top of the wall 37 extend outwardly through the and into the respective chamber 42 being connected to the inlet and outlet of the heat exchanger 48 therein so as to provide closed loop circuits. The pipe run 51 is therefore the 'cool' leg and the pipe run 52 is the 'hot' leg. The closed loops are each filled with sodium/potassium alloy (NaK). The forced draft air fed to regions 47 of the chambers 42, in addition to providing the concrete and surge tank cooling circuits, also flows through the heat exchangers 48 to cool the NaK in the closed loop circuits. The purpose of the closed loop circuits of NaK is to cause sodium in the vault 14 (up to level L, FIG. 3) to solidify in the interspace between the lining 39 and the structure 50 (in the case of the wall 37) and between the lining 39 and the insulation 53 (in the case of the base 36). This solidified sodium 60 provides the container for the sodium pool in vault 14, the vault 14 providing the supporting means 38 for the solidified sodium container.

The surge tanks 49 are connected by ducts 54 which enter the vault 14 at the top, extending through thermal insulation 57 provided on the lower surface of roof 28. Thermal insulation 57 is also provided on the lower surface of shields 27, 29. Normal level of sodium is indicated by L in FIG. 2 and the space 58 above the sodium is occupied by a blanket gas, preferably argon. Should the sodium pool reach an excessive temperature and not only expand but also melt some or all of the solid sodium layer 60 so that the sodium level rises from the normal level L to fill the vault 14, the ducts 54 and surge tanks 49 (which are cooled by the air flow from regions 47 of chambers 42) from an additional volume for overflow. The main heat exchangers have manually operable valves (not shown) in ducts 56 (FIG. 3) for establishing communication and convection flow between the pool sodium and the enclosed primary circuit sodium, mainly to be able to employ the pool sodium as a heat sink should a sodium pump or pumps fail. In any event, a small amount of leakage between the primary circuit and the pool will take place at the core lid 17 due to differential thermal expansion.

The provision of the novel, sodium-containing solid sodium layer 60 is consider to provide the reactor with an important safety feature which has particular revelance to large plants, for the reasons implicit in the advantages hereinbefore set forth.

The invention is seen as being widely applicable to nuclear reactors necessitating the containing of a freezable liquid coolant. Other examples of liquid coolants to which the invention appears to be applicable are other liquid metals in addition to sodium, polyphenyls, and fused salts. An example of the last-named is a mixture of lithium fluoride and beryllium difluoride, published as having been employed for the secondary coolant in the Molten Salt Reactor Experiment (MSRE), Oak Ridge National Laboratory, U.S.A.

I claim:

1. A nuclear reactor comprising a concrete shielding vessel with a steel lining, containing a freezable liquid metal coolant comprising the element sodium, a solid nuclear reactor core, a primary heat exchanger and a pump means all submerged in the coolant, the pump means being provided for circulating the coolant liquid within the vessel, cooling pipes within the vessel adjacent the inner surface of said vessel for effecting the freezing of the liquid coolant at the inner surface of the vessel, said cooling pipes containing a liquid metal cooling fluid, an interior wall adjacent the said inner surface, said interior wall comprising a frozen layer of the liquid coolant on and supported by the cooling pipes and the inner surface of the vessel, the said frozen layer interior wall being thin relative to the overall cross-section of the vessel.

2. A nuclear reactor according to claim 1, in which the pipes extending over the surface are closed loops, each loop including a cooler externally of the concrete and steel vessel, and a forced air cooling system for cooling the said liquid metal coolant in the closed loops at the cooler.

3. A nuclear reactor according to claim 1, including additional cooling pipes embedded in the concrete in proximity to the lining.

4. A nuclear reactor according to claim 3, including thermal insulation spaced from said surface.

5. A nuclear reactor according to claim 4, wherein said thermal insulation is located with runs of said cooling pipes disposed on both sides thereof.

6. A nuclear reactor according to claim 1, wherein the liquid coolant is sodium and the cooling fluid within the closed loops contains sodium-potassium alloy, and including further pipes embedded in the concrete and means for passing forced air therethrough.

7. A nuclear reactor according to claim 1, said interior wall being of sufficient thickness such that when the temperature of the liquid coolant inside is 400° C, the temperature at the outer surface of the interior wall is approximately 50° C.

* * * * *